United States Patent Office 2,789,960
Patented Apr. 23, 1957

2,789,960

PERFLUOROCHLOROOLEFIN POLYMERS PLASTICIZED WITH PERFLUOROCHLOROOLEFIN COPOLYMERS

Richard A. Smith, Cornwall on the Hudson, N. Y., assignor to The M. W. Kellogg Company, Jersey City, N. J., a corporation of Delaware No Drawing. Application November 27, 1953, Serial No. 394,896

10 Claims. (Cl. 260—45.5)

This invention relates to halogen-containing plastics. In one of its aspects, this invention relates to a plasticizer for perfluorochloroolefin plastics, while in one of its more particular aspects, this invention relates to the plasticization of copolymers of trifluorochloroethylene. In another of its aspects, this invention relates to a process for plasticizing perfluorochloroolefin copolymers, such as polymers of trifluorochloroethylene.

Because of their unusual chemical and physical characteristics the fluorine-containing thermoplastic polymers are widely used in numerous industrial applications. Among the most outstanding of the properties of the fluorine-containing thermoplastic polymers, such as polymers of trifluorochloroethylene, is chemical inertness. Thus, these polymers may be exposed to a wide variety of oxidizing, reducing and solvent-type reagents such as, fuming nitric acid, hydrazine, and aniline with no apparent effect on the polymer. In addition to their high degree of chemical stability, these polymers possess high thermal stability, excellent electrical properties and are readily molded into various useful items.

In many of the applications in which industrial users employ these plastic polymers, it is desirable that the properties of the polymer be somewhat modified. Modification of the polymer's properties is usually effected by plasticization. The addition of a plasticizer makes the polymer softer and more elastic. In the past, plasticization of the perfluorochloroolefin polymers was effected by adding a lower molecular weight perfluorochloroolefin polymer i. e., a polymer in the oil, grease or wax range. For example, in plasticizing solid, plastic homopolymers of trifluorochloroethylene, a liquid polymer of trifluorochloroethylene was used. Copolymers of trifluorochloroethylene have also been plasticized with a liquid polymer of trifluorochloroethylene. While the use of this type material as plasticizer is quite good in modifying the properties of the thermoplastic polymer some inherent disadvantages are attendant on its use. Thus, these liquid polymers are volatile, solvent soluble, have limited compatibility with the thermoplastic polymer, a tendency to "bleed," and are deleteriously affected at low temperatures. In addition, the chemical stability of these liquid plasticizers is not as great as might be desired.

It is an object of this invention to provide a non-volatile plasticizer for plasticizing perfluorochloroolefin copolymers.

It is another object of this invention to provide a plasticizer for perfluorochloroolefin copolymers which is not substantially subject to solvent extraction.

It is another object of this invention to provide a plasticizer for perfluorochloroolefin copolymers which has an unlimited compatibility with the thermoplastic copolymers which are to be plasticized.

It is another object of this invention to provide a chemically stable plasticizer.

It is another and more particular object of this invention to provide a plasticizer for copolymers of trifluorochloroethylene.

It is one of the additional objects of this invention to provide a process for plasticizing copolymers of trifluorochloroethylene.

Various other objects and advantages of the present invention will become apparent to those skilled in the art on reading the accompanying description and disclosure.

In general the above objects are accomplished by admixing with the thermoplastic copolymer of the perfluorochloroolefin that is to be plasticized, a different normally solid copolymer of a perfluorochloroolefin, such as trifluorochloroethylene, copolymerized with another halogenated olefin.

The copolymers of the perfluorochloroolefins which are susceptible to plasticization by the process of this invention are prepared by the copolymerization of perfluorochloroolefins, such as trifluorochloroethylene, 1,1-dichloro 2,2 - difluoroethylene, 1,2 - dichloro-1,2-difluoroethylene and trichlorofluoroethylene with other halogenated olefins, such as vinyl chloride, vinylidene chloride, vinyl fluoride, vinylidene fluoride, and 1,1-fluorochloroethylene. Those copolymers which are particularly suited to plasticization by the process of this invention contain above 69 mol percent of a perfluorochloroolefin, such as trifluorochloroethylene. When less than 69 mol percent of perfluorochloroethylene is present, the addition of a copolymer containing a lower percentage of perfluorochloroethylene merely exerts a softening effect but does not act as a true plasticizer.

The copolymers which serve as plasticizers in this invention, comprise fluoroolefins, preferably perfluorochloroolefins, such as, trifluorochloroethylene, 1,1-dichloro - 2,2 - difluoroethylene, 1,2 - dichloro-1,2-difluoroethylene, trifluoroethylene and trichlorofluoroethylene copolymerized with halogenated olefins containing at least two hydrogen atoms per molecule such as, vinyl chloride, vinylidene chloride, vinyl fluoride, vinylidene fluoride, 1,1-fluorochloroethylene. These copolymeric plasticizers are normally solid, have softening points above about 150° C. but below the softening point of the material that is to be plasticized, have a Shore A hardness of below about 80, are more soluble in oxygenated organic solvents and contain a higher percentage of hydrogen than the material that is to be plasticized. A particularly suitable plasticizer is a copolymer of trifluorochloroethylene and vinylidene fluoride, wherein trifluorochloroethylene is present in an amount between about 5 and about 95 mol percent. Preferably, the trifluorochloroethylene-vinylidene fluoride copolymers contain trifluorochloroethylene in an amount between about 20 and about 80 mol percent.

Selection of the plasticizer is based on the composition of the material that is to be plasticized. The plasticizer is a more soluble compound, containing a higher percentage of hydrogen and a lower mol percentage of perfluorochloroolefin. Thus, a copolymer of trifluorochloroethylene and vinylidene fluoride which contains above 95 and less than 100 mol percent of trifluorochloroethylene may be plasticized with a copolymer which contains between about 5 and less than 95 mol percent of trifluorochloroethylene, preferably above 69 and not higher than 80 mol percent of trifluorochloroethylene. A copolymer which contains above 69 and not higher than 80 mol percent of trifluorochloroethylene is plasticized with a copolymer of trifluorochloroethylene containing between about 20 and about 69 percent of trifluorochloroethylene.

In my copending application Serial No. 394,895, of even date, I disclosed the plasticization of perfluorochloroolefin homopolymers such as, a homopolymer of trifluorochloroethylene with the copolymeric plasticizers described herein. As was pointed out in my copending application, a particularly surprising feature of this invention is the extent of plasticization achieved by the inclusion of only a small amount of plasticizer. Thus, when a homopolymer of trifluorochloroethylene was plasticized with about 5 weight percent of the solid copolymeric plasticizer (see Example I) a film was obtained which had the characteristics of a film of the same material plasticized with about 25 weight percent of the prior art plasticizers, that is a polytrifluorochloroethylene oil. Similar observations were made with respect to the plasticizers of this invention. The plasticizers of this invention are compatible with the material that is to be plasticized in all proportions. However, it is preferred to use less than 50 weight percent of the plasticizer and preferably because of the extent to which these plasticizers effect the material that is to be plasticized between about 1 and about 25 weight percent.

Since the process of this invention relates to new and novel plasticizers and their use, unnecessarily detailed description of the methods of preparation of the plasticizer is not warranted. Therefore, only methods of preparation of the preferred plasticizer are given although by employing substantially identical polymerization systems but with different monomer feed ratios and polymerization times any copolymer in the range contemplated by this invention may be prepared.

The preferred plasticizer may be prepared by the procedure given below using the following water-suspension type recipe.

| | Parts by weight |
|---|---|
| Water, distilled | 200 |
| $CF_2=CFCl$ | 92.2 } 86/14 molar |
| $CF_2=CH_2$ | 7.8 |
| $(NH_4)_2S_2O_8$ | 2.0 |
| $Na_2S_2O_5$ | 0.8 |
| $FeSO_4 \cdot 7H_2O$ | 0.2 |

Catalyst and activator solution was prepared by dissolving 2 parts of $(NH_4)_2S_2O_8$ in 20 parts of water. Next, 0.8 parts of $Na_2S_2O_5$ were dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $FeSO \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric products was 75 percent.

Admixture of the plasticizer with the polymer may be effected in a variety of ways although usually the conventional mechanical techniques are preferred. The method to be employed in effecting the admixture is based on the form of the polymer and plasticizer. Thus, if both the polymer and the plasticizer are finely-divided i. e. in the form of a powder, conventional tumbling type mixers such as a barrel mixer, conical mixer and mushroom mixer may be employed. If the polymer and plasticizer are not in a sufficiently finely-divided form, then they may be ground in a suitable grinding type mixer such as a Mikropulverizer. Admixture may also be effected by a wet-blending technique employing a suitable solvent. Complete solubility of the plasticizer, while preferred, is not essential. Admixture, when using wet-blending techniques, is effected by treating the ingredients in the desired proportion in an apparatus suitable for wet-blending, such as a ball mill.

Suitable solvents are the oxygenated organic solvents in some of which the plasticizer is completely soluble, while in others it is partially soluble. Thus, the plasticizer is soluble in tetrahydrofuran, tetrahydro-2-methyl furan, tetrahydropyran, 3-chlorotetrahydrofuran and dioxane. Among the solvents in which the plasticizer is partially soluble are ethyl acetate, isobutyl propionate, amyl acetate, methyl ethyl ketone, isophorone, diisobutyl ketone, cyclohexanone, mesityl oxide, 1-chloro 1-nitroethane and 2-chloro 2-nitropropane. A particularly suitable solvent is tetrahydrofuran; a particularly suitable mixture is tetrahydrofuran and dioxane. Preferably equal amounts by volume of each solvent constitute the mixture although the solvent in which the plasticizer is completely soluble may constitute from about 25 percent to about 95 percent of the mixture.

Molding of the plasticized polymer powder may be accomplished by using suitable molding equipment at temperatures between about 415° F. and about 625° F. and a pressure between about 500 and about 25,000 pounds per square inch. Detailed description of the preferred molding processes may be found in U. S. Patents 2,617,149, 2,617,150, 2,617,151 and 2,617,152, issued November 11, 1952, to Louis C. Rubin. When the plasticized polymer powder of this invention is molded by any of the above described processes a homogeneous polymer mass is produced, which contains, intimately dispersed within this mass, the added plasticizer. When a solvent has been used in the blending operation, the solvent is preferably evaporated, by heating or air-drying, before the molding operation is begun.

The copolymeric plasticizers of this invention may be treated in such a way as to induce cross-linking of the copolymer chain. For this purpose a copolymer containing between about 20 and about 69 mol percent of perfluorochloroolefin, such as trifluorochloroethylene, is preferred. This cross-linking modifies the properties of the plasticizer and enhances its suitability for use in certain applications. These cross-linked polymers are considerably less soluble, have increased strength, toughness, heat resistance, and greater chemical resistance. Generally, cross-linking of the copolymeric plasticizers is effected by incorporating within the copolymer a cross-linking agent which may be a peroxy-type compound, a basic metal oxide or an inorganic polysulfide. The peroxy-type compounds include both organic and inorganic compounds which contain oxygen atoms directly linked to oxygen atoms, and should be stable below about 50° C. or else they will cause cross-linking while they are being blended into the copolymer. Among the organic compounds are the aryl and acyl peroxides and hydroperoxides such as, ditertiary butyl peroxide, di-lauryl peroxide, di-benzoyl peroxide, and ditertiary butyl hydroperoxide. The organic peroxy-type compounds also include peresters having either organic or inorganic peroxy oxygen. The former would include such compounds as alkyl, aryl perbenzoates, the latter would include alkyl and aryl persulfates. Among the inorganic peroxy compounds, are hydrogen peroxide and metal peroxides, such as lead, barium, and zinc peroxide. Among the basic oxides which may be used as linking agents are magnesium oxide, zinc oxide, and lead oxide. Among the inorganic polysulfides which may be used are the alkali metal polysulfides and ammonium polysulfides. In order to effect the cross-linking reaction, it is necessary that the plasticizer containing cross-linking agent be heated for a period of time after it has been admixed with the material that is to be plasticized. Generally, a temperature between about 100° C. and about 200° C., depending upon the decomposition temperature of the cross-linking agent, and a period of time between about 1 hour and about 48 hours is required. This time-temperature cycle may be effected during the molding operation or after molding in which case the molded article is maintained at preferred temperatures in an oven. A particularly valuable cross-linking reaction employing diamines, such as ethylene diamine, diethylene triamine, hexamethylene diamine, diamino stilbene, etc. is described in the copending application Serial No. 372,159, filed August 3, 1953, by Fred W. West.

In order to illustrate the process of this invention, the following examples are presented below. These data are offered for purposes of illustration and are not to be construed as unnecessarily limiting.

Example I

A physical mixture of a homopolymer of trifluorochloroethylene in the form of a low density powder (about 100% through a 16 mesh screen) was admixed with a 12% solution of a copolymer of trifluorochloroethylene and vinylidene fluoride (about 75:25 mol ratio) in a solvent mixture of tetrahydrofuran and xylene. The proportions were such that the result was 5% by weight of plasticizer and 95% by weight of the homopolymer of trifluorochloroethylene. The mixture was blended in a ball mill and a film was pressed from the resulting paste. The temperature was 170° C., the pressure 2500 p. s. i. g.; time was 20 minutes. A 10 mil film was so prepared, which was flexible, strong, transparent, uniform and pinhole free.

Example II

The paste mixture described in Example I was air-dried and a film was pressed from the dried residue under the conditions enumerated in Example I; the film was identical to that described in Example I.

Example III

A physical mixture of a homopolymer of trifluorochloroethylene was made with a solvent mixture of tetrahydrofuran and xylene. The mixture was blended in a ball mill, and the resultant paste was pressed under the conditions described in Example I. This film was hard, brittle, translucent and had some pinholes. The omission of the plasticizer obviously affected the quality of the product.

Example IV

A physical mixture of a copolymer of trifluorochloroethylene and vinylidene fluoride (98:2 mol ratio) and 10 weight percent of another copolymer of trifluorochloroethylene and vinylidene fluoride (75:25 mol ratio), was made by grinding in a Wiley mill fitted with a 20 mesh screen. Three passes through the mill were made with stirring between each pass. The admixture thus prepared, was pressed at 149° C. and a pressure of 2500 p. s. i. g. A 10–12 mil thick film of marked flexibility and elasticity were thus prepared.

Example V

A copolymer of trifluorochloroethylene and vinylidene fluoride (98:2 mol ratio) was ground in a Wiley mill, and molded as described in Example I. The resulting film was hard and brittle.

Example VI

Ten percent by weight of a copolymer of trifluorochloroethylene and vinylidene fluoride (50:50 mol ratio) was blended in a Wiley mill with 90% of a copolymer of trifluorochloroethylene and vinylidene fluoride (75:25 mol ratio). Three passes through the mill, which was fitted with a 20 mesh screen, were made. A film was pressed from the resulting mixture by the process described in Example I. This film was flexible and elastic.

Example VII

As a control, a copolymer of trifluorochloroethylene (75:25 mol ratio) was treated as in Example I. The film which was produced, lacked the flexibility and elasticity of the film in Example III.

Various alterations and modifications of the invention and its aspects may become apparent to those skilled in the art without departing from the scope of this invention.

Having thus described my invention, I claim:

1. A novel composition which comprises a copolymer comprising between about 5 and less than 100 mol percent of a perfluorochloroethylene and the remaining major constituent being another ethylene having at least one halogen substituent selected from the group consisting of fluorine and chlorine admixed with a different copolymer comprising between about 5 and about 95 mol percent of a perfluorochloroethylene and containing a lower mole percentage of perfluorochloroethylene than the mole percentage of perfluorochloroethylene in the aforesaid copolymer and the remaining major constituent being another ethylene having at least one halogen substituent selected from the group consisting of fluorine and chlorine.

2. The composition of claim 1 wherein at least one of the halogenated olefins is 1,1-fluorochloroethylene.

3. The composition of claim 1 wherein at least one of the halogenated olefins is vinylidene chloride.

4. The composition of claim 1 wherein at least one of the halogenated olefins is vinyl chloride.

5. The composition of claim 1 wherein at least one of the halogenated olefins is vinylidene fluoride.

6. The composition of claim 1 wherein at least one of the halogenated olefins is vinyl fluoride.

7. A novel composition which comprises a thermoplastic copolymer comprising at least 95 mol percent of trifluorochloroethylene and the remaining major constituent being vinylidene fluoride admixed with a copolymer comprising between about 5 and less than 95 mol percent of trifluorochloroethylene and the remaining major constituent vinylidene fluoride as a plasticizer.

8. A novel composition which comprises a copolymer comprising more than 69 and less than 80 mol percent of trifluorochloroethylene and the remaining major constituent being vinylidene fluoride admixed with a copolymer of trifluorochloroethylene and vinylidene fluoride comprising between 20 and less than 69 mol percent of trifluorochloroethylene and the remaining major constituent being vinylidene fluoride as a plasticizer.

9. A novel composition which comprises a normally solid copolymer comprising between about 5 and less than 100 mole percent of a perfluorochloroethylene and the remaining major constituent being another ethylene having at least one halogen substituent selected from the group consisting of fluorine and chlorine admixed with less than 50 weight percent of a different normally solid copolymer comprising between about 5 and about 95 mole percent of trifluorochloroethylene and containing a lower mole percentage of trifluorochloroethylene than the mole percent of perfluorochloroethylene in the aforesaid copolymer and the remaining major constituent being another ethylene having at least one halogen substituent selected from the group consisting of fluorine and chlorine as a plasticizer.

10. A novel composition which comprises a normally solid copolymer comprising between about 5 and less than 100 mole percent of trifluorochloroethylene and the remaining major constituent being another ethylene having at least one halogen substituent selected from the group consisting of fluorine and chlorine admixed with less than 50 weight percent of a different normally solid copolymer comprising above about 5 mole percent of trifluorochloroethylene and containing less trifluorochloroethylene than the aforesaid copolymer and remaining major constituent being vinylidene fluoride as a plasticizer.

No references cited.

UNITED STATES PATENT OFFICE

CERTIFICATE OF CORRECTION

Patent No. 2,789,960                                      April 23, 1957

Richard A. Smith

It is hereby certified that error appears in the printed specification of the above numbered patent requiring correction and that the said Letters Patent should read as corrected below.

Column 3, line 42, for "$FeSO \cdot 7H_2O$" read -- $FeSO_4 \cdot 7H_2O$ --.

Signed and sealed this 4th day of June 1957.

(SEAL)
Attest:

KARL H. AXLINE                                                 ROBERT C. WATSON
Attesting Officer                                         Commissioner of Patents